United States Patent [19]

Tucker

[11] 4,087,650
[45] May 2, 1978

[54] COLUMN AND LEVER CONSTRUCTION FOR A CHARACTERED TELEPHONE

[75] Inventor: Council A. Tucker, Los Angeles, Calif.

[73] Assignee: American Telecommunications Corporation, El Monte, Calif.

[21] Appl. No.: 743,116

[22] Filed: Nov. 19, 1976

[51] Int. Cl.² ............................................. H04M 1/02
[52] U.S. Cl. .................................. 179/100 D; 179/164; 179/179; D14/53
[58] Field of Search ............... 179/100 R, 100 D, 159, 179/164, 165, 178, 179, 146 R, 146 L, 147, 149, 100 C; 46/33; 40/336, 337, 338, 339, 340; D14/53, 59, 60

[56] References Cited

U.S. PATENT DOCUMENTS

| D. 225,413 | 12/1972 | Scoggins ............................. D14/53 |
| 1,083,406 | 1/1914 | Knight et al. ....................... 179/164 |
| 1,340,863 | 5/1920 | Knight ..................................... 46/33 |
| 1,361,628 | 12/1920 | Shailer .................................. 46/116 |
| 1,388,703 | 8/1921 | Gray ..................................... 179/164 |
| 3,745,267 | 7/1973 | Tucker et al. ....................... 179/179 |
| 3,773,985 | 11/1973 | Tucker ............................. 179/100 D |

OTHER PUBLICATIONS

C&P Telephone Brochure; "Design Line Phones"; Candlestick Design available before Jul. 1976.
The American Inventor; Apr. 1, 1904; p. 163.

*Primary Examiner*—Kathleen H. Claffy
*Assistant Examiner*—Randall P. Myers
*Attorney, Agent, or Firm*—Christie, Parker & Hale

[57] ABSTRACT

A column mounts on a base housing and mounts a lever for pivotal movement between an "off-hook" and an "on-hook" position. A portion of the lever is an arm of a fanciful character which holds a telephone handset. The column attaches the character to it and the base housing. The lever has a collar in receipt of the column and an actuation tab from the collar for sliding contact with a nose of a finger of an actuator. The actuator transmits off-handset and on-handset signals to a hook switch in the base housing. A pivot bracket mounts the lever on the column diametrically opposite the finger and character arm and outwardly and away from the column. The lever moves through a comparatively small angle for a comparatively large displacement of the end of the lever represented by the arm of the character. A platform of the pivot bracket bears against laterally extending ribs of the column and attaches to the column by a fastener and hook-and-slot engagement.

15 Claims, 6 Drawing Figures

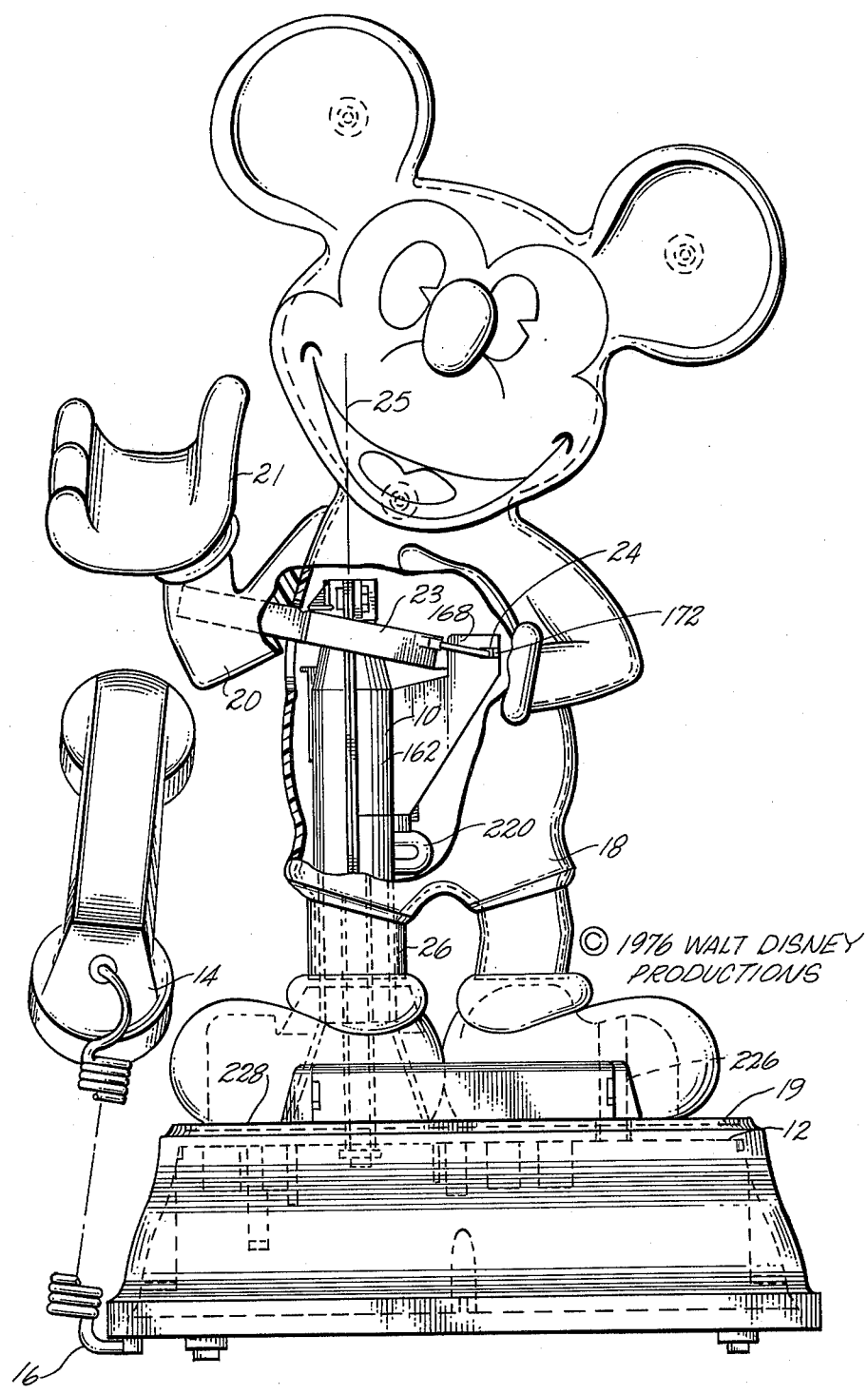

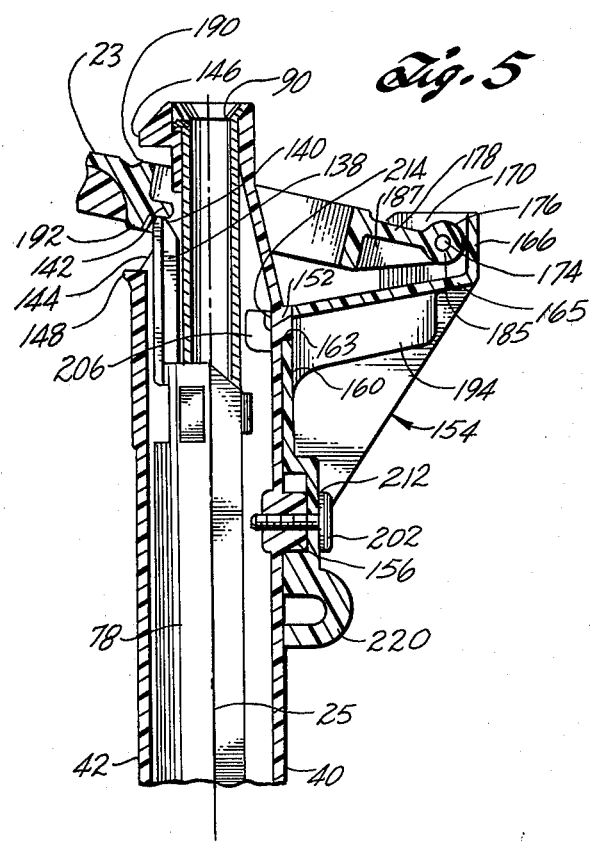
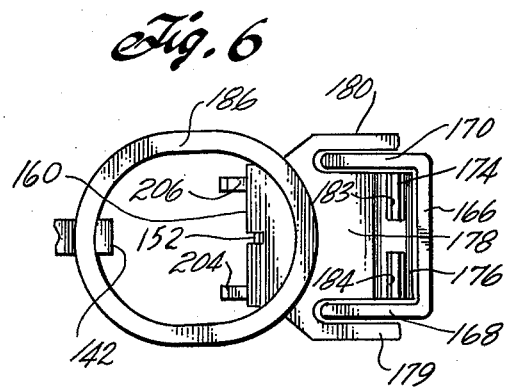

COLUMN AND LEVER CONSTRUCTION FOR A CHARACTERED TELEPHONE

BACKGROUND OF THE INVENTION

The present invention relates to the art of telephones in general and, in particular, to a column and lever construction particularly useful in charactered telephones.

Charactered telephones are telephones having a fanciful character as an integral part of the telephone. The fanciful character makes the telephone an appealing consumer item.

A telephone ringer, dialer, network, and hook switch must be housed in a base housing.

For maximum impact, the character of the telephone stands freely from the base housing. The character must be supported against various in-use loads. For example, a character comparatively tall with respect to the base housing can be subjected to lateral loads which induce substantial moment loads between the character and the base housing.

It is highly desirable to provide a uniform base housing and functional accoutrements so as to be able to accept characters of different personality without changing the base housing and other functionals.

Part of the appeal of a charactered telephone is the ability to use something of the character while using the telephone. That is, to implement the character functionally into the telephone instrument is desirable. This must be done without loss of the appeal of the particular character being used.

SUMMARY OF THE INVENTION

The present invention provides a column construction mounted on a base and adapted for mounting a fanciful character or figure. The character integrates into the telephone instrument functionally by having an appendage movable through an arc, which supports a telephone handset, and transmits "off-hook" and "on-hook" signals to a telephone network in the base housing.

In general, the present invention comprises a base housing and a column extending upwardly from the base and attached thereto. The column carries a translatable actuator actuated by a pivotally mounted lever. The lever mounts to the column above the base housing on a pivot bracket that is laterally displaced from the axis of the column so as to develop considerable linear movement of the lever with a small amount of angular displacement. The lever extends away from the column on the side thereof opposite the pivot. This extension mounts the appendage. The appendage holds the handset. Means sensitive to linear movement of the lever transmit the off- and on-hook signals to the telephone network in the base. Preferably, these means comprise a linear actuator. Means attach a fanciful character to the column.

A particular form of the invention has a collar of the lever receiving the column. A tab extends inwardly of the collar for bearing on a finger of the linear actuator with sliding engagement. The sliding engagement of the finger with the tab allows the latter to move purely linearly. This engagement is on the diametric opposite side of the column from the pivot bracket. The lever attaches an arm and hand of the character on the same side of the column as the finger engaging tab. The hand of the character can clasp and hold a telephone handset.

The weight of the handset rotates the lever down to push the actuator and indicate an "on-hook" condition. Biasing means acting on the actuator rotate the lever in the opposite direction, upwardly, when the handset is "off-hook." The arm then raises and lowers and forms a part of the functional equipment of the telephone. The pivot bracket attaches to the side of the column and defines a pivot for the lever considerably to one side of the column. The lever, then, extends to each side of the column and, through the collar, receives the column. The comparatively small angular sweep of the arm still produces considerable linear displacement of the arm predominantly in the vertical. The arm then mimics the character with great fidelity and does not interfere with the body or head of the character.

A particular construction of the present invention has the column split along its major or longitudinal axis and united together on longitudinal flanges as by sonic welding. A window in the top of the column passes the actuator finger that bears on the tab of the lever. Opposite this bearing, the lever pivotally mounts on the pivot bracket, which itself mounts along the column by a pair of hooks and a threaded fastener. The pivot bracket has a cup proximate its bottom with a recess longitudinal with respect to the column. Mounting ribs extending laterally of the column bear on the pivot bracket. A pair of slots in the column receive the hooks of the pivot bracket and accept some longitudinal movement of the base with respect to the column. An indexing tab on the column indexes in a slot of the pivot bracket of the pivot for lateral stabilization before hook engagement. The ovular cup permits relative movement also. During assembly the pivot bracket can be proximated to the ribs with the cup in receipt of a fastener boss of the column and the hooks of the pivot bracket in the slots. The pivot bracket can then be moved longitudinally so that the hooks engage the column and the cup abuts the boss. A threaded fastener through the cup and into the boss secures the bracket to the column.

A strap of the pivot bracket passes a fastener which attaches the character to the column. The strap provides the sole fastening device of the character to the column and base housing, other than pedestal support that the base can provide.

A web of the lever extends between upstanding wings of the pivot bracket. Keepers parallel the web and retain a pivot pin in a pivot pin boss at the extreme end of the web. Slots in the wings receive the pivot pin, but pivot stability comes from the boss engaging an upright wall and a platform wall of the bracket, both walls spanning the wings.

These and other features, aspects and advantages of the present invention will become more apparent from the following description, appended claims and drawings.

BRIEF DESCRIPTION OF THE FIGURES

FIG. 1 is a view, generally in elevation and partly broken away, of a column and base housing of the present invention together with a character or figure integrated into the column and base housing, showing the general overall organization of the combinations together with the laterally displaced pivot of the actuating lever;

FIG. 5 is an elevational view, partly in half section and fragmented, of the column and pivot bracket construction of the present invention; and FIG. 6 is a view in plan looking downwardly on the pivot bracket of the invention.

DESCRIPTION OF THE PREFERRED EMBODIMENT

Figure 4:
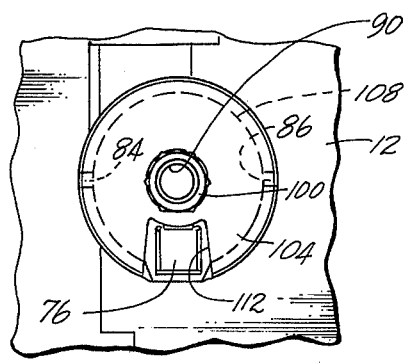
FIG. 4 is a view in bottom plan showing the attachment of the column to the base.

U.S. Pat. No. 3,773,985 to Council A. Tucker describes a unique column construction for upright telephones. This construction employs a guide tube which loads a cap, a column, and base adapter in compression. The guide tube itself is in tension. A connection between the bottom of the guide tube and the base housing of the telephone completes the load path necessary to give this compression-tension relationship.

The Tucker patent employs principles employed here in the integration of the column and base, as will be described in detail as this description proceeds.

The first Figure shows a general organization of the column, base housing, and character construction of the present invention. There, a column 10 mounts on a base housing 12 so as to extend vertically therefrom and off from a vertical centerline of the base. The base housing receives and houses the telephone components of a telephone dialer, ringer, network, and hook switch. A telephone handset 14 wires into the components in the base through a cord 16. The column attaches to the base with the tension and compression cooperation of a guide tube and column in the manner described in U.S. Pat. No. 3,773,985.

A character or FIG. 18 stands on a horizontal surface 19 of the base housing and attaches to the column. An appendage in the form of an arm 20 and hand 21 of the character can reciprocate back and forth through a limited angular path. The down position of this path corresponds to a handset "on-hook" position which signals the telephone components in the base housing that the handset of the telephone is not in use and is "hung up." The "up" position of the hand and arm indicates to the mechanisms in the base housing that the telephone handset is off the hook and in use. The angular displacement of the arm is comparatively small, but the linear displacement of the arm is comparatively large. This large displacement is used to signal the telephone handset "on-hook" and "off-hook" conditions. The limited angular displacement of the arm gives the arm a realistic swing and keeps the telephone handset away from the body and head of the character. The ends of a comparatively large linear displacement with small angular displacement are met by having the arm connected to and part of an actuating lever 23 and pivoting the lever at 24 substantially to one side of an axial longitudinal centerline 25 of the column.

In general, the telephone handset is cradled in hand 21 of the character and this rotates the actuating lever counterclockwise in FIG. 1 and signals an "on-hook" condition. Lifting the telephone handset from the hand of the character allows a biasing spring in column 10 to force the actuator lever clockwise in FIG. 1 and raise the hand. This indicates an "off-hook" condition.

A leg 26 of the character contains and passes column 10. The balance of the column above the base housing is hidden in the torso of the character.

The character shown in the Figures is licensed to the assignee of this application by Walt Disney Productions Inc. for use with telephone instruments.

Figure 2:
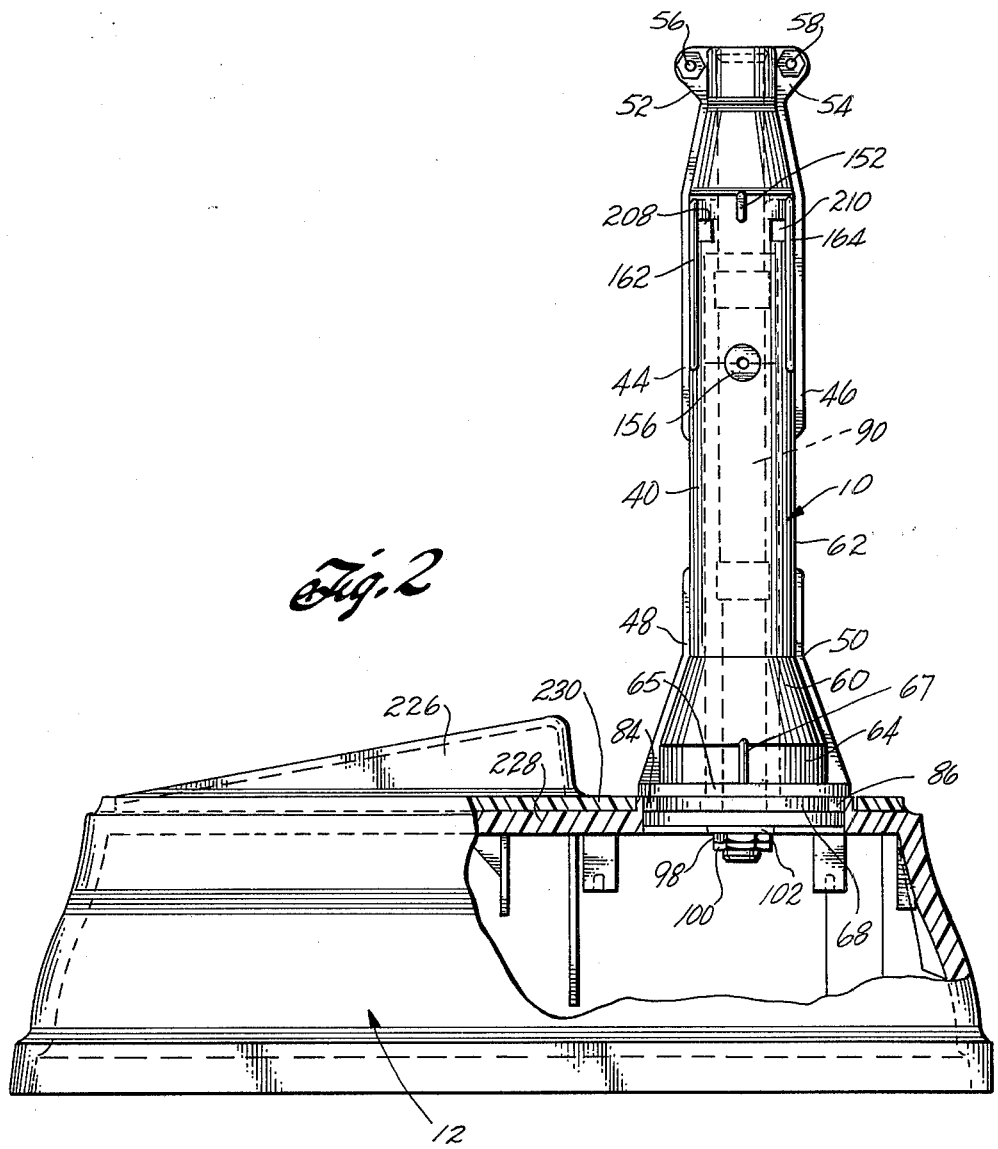
FIG. 2 is a view in elevation of the column mounted on the base housing.
Figure 3:
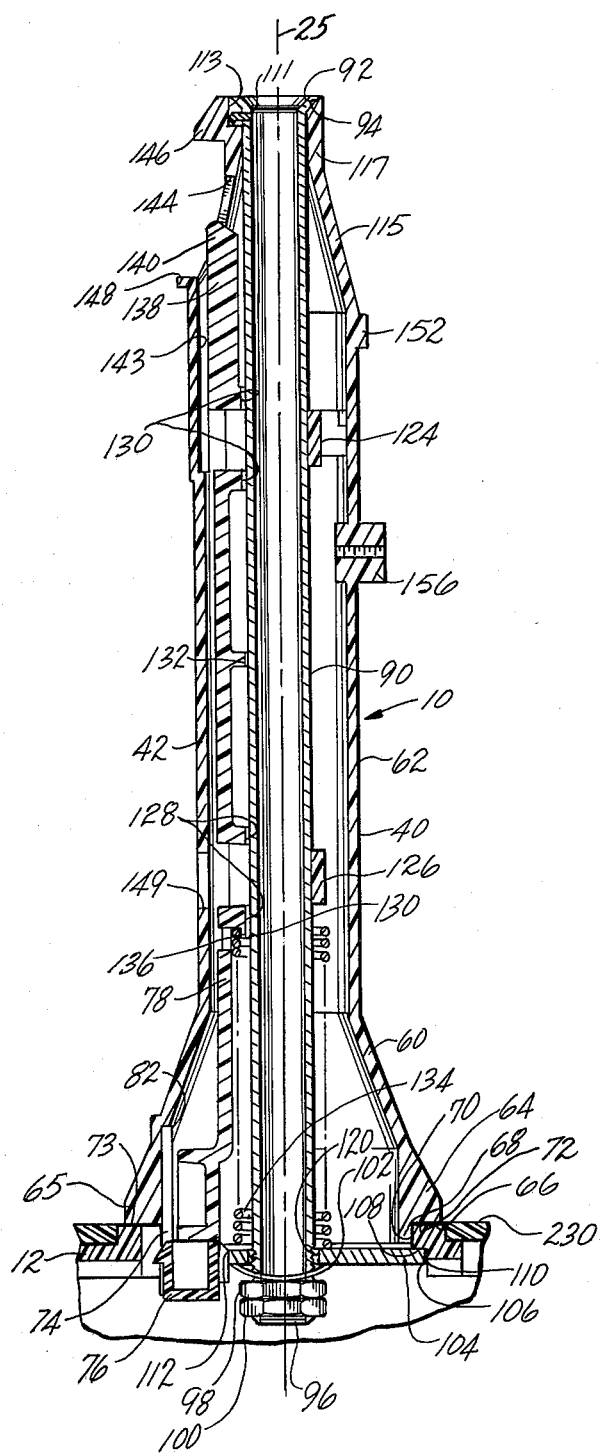
FIG. 3 is an elevational view in half section of the column taken 90° to the view of FIG. 2 and with only a fragment of the base being shown.

With particular reference to FIGS. 2 and 3, the column construction of the present invention is illustrated in detail. There, column 10 has two generally semi-cylindrical shells 40 and 42. These components attach to each other on abutting welding flanges 44, 46, 48 and 50 of the shells. Additionally, diametrically disposed and laterally extending ears 52 and 54, formed in flanges 44 and 46, receive threaded fasteners 56 and 58 to securely close the shells at their tops. This securing is important because of a guide tube discussed later. A column base 60 defined by a section which is mostly frusto-conical meets cylindrical section 62 of the column. The frusto-conical base of the column ends at a right cylindrical foot section 64 of major diameter proximate the bottom of the column. An annular clamping ring 65 extends radially of cylindrical foot section 64. 90° spaced-apart backing ribs 67 extend between the clamping ring and the foot section to stiffen the ring. An annular step 66 at the bottom of the clamping ring includes an axial, annular flange 68 received in a bore 70 of the base housing. A radial surface 72 of the step rests on a horizontal and complementary surface 73 of the base housing and extends for a full 360° around the bottom of the column. Surface 72 is the clamping surface of the clamping ring. Flange 68 does not extend as far and is interrupted by a space 74 that passes an actuator button 76 of an actuator sleeve 78. Actuator sleeve 78 is capable of pure linear motion parallel to longitudinal axis 25 of the column. A relief 82 in the column base assures that the actuator sleeve does not bind on the column shell, and actuator button 76 is free to act on a hook switch (not shown) of the equipment in the base housing. In FIG. 2, index tabs 84 and 86 extend radially of flange 68 for receipt in complementary slots or keyways in the base housing. This angularly locks the column with respect to the base.

The column then is composed of two shells joined together along a longitudinal plane of the column. The column sets upon the base and has a longitudinal flange received in a hole of the base. The column locks angularly with respect to the base by tabs in keyways. An actuator sleeve in the column passes into the base by an actuator button to engage the switch of components housed in the base housing.

With primary emphasis on FIG. 3, a guide tube 90 extends the length of the column and has a flared upper end 92 which bears on a complementary tapered bearing surface or seat 94 at the top of the column. Threads 96 at the bottom of the guide tube receive a pair of nuts 98 and 100. Nut 98 bears on a bowed spring washer 102, which in turn bears on a heavy washer 104. Washer 104 receives in an annular recess 106 of the housing. A horizontal annular surface 108 of this recess bears compressively against the washer. A longitudinal annular surface 110 bounding the recess centers and captures the washer. Bowed washer 102 couples the guide tube to heavy washer 104 and permits some dimensional accommodation in the longitudinal direction while retaining the tension-compression coupling of the column to the base. Flare 92 is struck at 111 to develop a tab which indexes in a longitudinal keyway 113 at the top of the column. Thus the guide tube will not rotate when nuts 98 and 100 are installed. Column 10 reduces in diameter through a frusto-conical transition section 115 to a neck 117. This neck clears the outside surface of guide tube 90 below and adjacent to flare 92. A cutout 112 in washer 104 passes and guides actuator button 76. A hole 120 in heavy washer 104 passes the guide tube.

Actuator sleeve 78 includes upper centering semi-ring 124 and lower centering semi-ring 126. These rings extend laterally from the main body of the actuator sleeve for receipt of the guide tube. Complementary bearing shoulder sets 128 and 130 inside rings 126 and 124, in the sense of the main body of the actuator, bear on the inside of the guide tube. An intermediate stiffening shoulder 132 is located between shoulders 128 and 130 clearing the guide tube. Each bearing shoulder set has a U-shaped bearing surface for bearing on guide tube 90. The open end of the "U" faces the open end of the semi-rings and together the U-shaped bearing surface and semi-rings cooperate to give substantially complete 360° bearing on the guide tube. Each bearing set comprises a pair of individual shoulders with each shoulder defining a U-shaped bearing surface. Thus the actuator pilots on the guide tube and is retained by the guide tube from moving radially of axis 25.

In FIG. 3, a compression spring 134 acts between an upper surface of heavy washer 104 and lower bearing shoulder 128 to bias the actuator sleeve upwardly in the Figure. A centering tab 136 axially depends from bearing shoulder 128 and keeps the spring concentric with axis 25.

As seen in both FIGS. 3 and 5, a finger 138 extends upwardly from an integral connection with the balance of actuator sleeve 78. As seen in FIG. 5, the finger has a rounded nose 140 for sliding engagement with an inwardly extending tab 142 of lever 23. A relief 143 in the column prevents the finger and the actuator from binding on the column shell.

As seen best in FIG. 5, a window 144 passes nose 140 of the actuator. An upper stop 146 extends laterally from shell 42 of the column and axis 25 for engagement by lever 23 and a determination of the lever's maximum upper position. A bottom stop 148 of the shell at the bottom of window 144 and extending laterally away from axis 25 determines the lowest position of the lever. The wall of relief 143 axially backs lower stop 148.

As seen in FIG. 3, a window 149 opens through the wall of the column for access to the actuator sleeve by a probe.

With reference again to FIG. 5, an indexing tab 152 of shell 40 extends laterally away from axis 25 to be received in a slot of pivot bracket 154. A fastener and indexing boss 156 also extends laterally of axis 25 below index tab 152 for the mounting of the pivot bracket assembly. As seen in FIG. 2, ribs 162 and 164 extend laterally of column 10, and tab 152 is midway between them.

With reference in general to FIGS. 1, 2, 5 and 6, pivot bracket 154 has a vertical wall 160 for bearing against the laterally extending ribs 162 and 164 of column 10. Wall 160 has a slot 163 for receipt of indexing tab 152 medially of the pivot bracket and column. A platform wall 165 extends generally laterally from wall 160 to an offset vertical wall 166.

A pair of upstanding wings 168 and 170 extend inwardly from vertical wall 166 and upwardly from generally horizontal wall 165. Each of these upstanding wings has a comparaively long and narrow slot typified comparatively slot 172 in wing 168 shown in FIG. 1.

These slots receive a pivot pin 174. A pivot boss 176 of a web 178 of lever 23 bears against back wall 166. As seen in FIG. 5, this bearing determines the position of the lever away from axis 25. The interior edge of the slots engage pivot pin 174 and determines the closest position of the pivot to axis 25. The upper and lower edges of the slot determines the vertical position of the pivot pin.

The pivot boss is generally cylindrical with core slots 183 and 184 in its top and a single core slot 185 medially between these two in the bottom.

Web 178 is reinforced in the vertical by a pair of spaced-apart, generally laterally extending gussets 187.

Keeper fingers 179 and 180 extend along the outside of wings 168 and 170 to keep pin 174 within pivot boss 176.

Web 178 extends from boss 176 to a generally ovular ring-like collar 186. This collar receives the top of column 10. It is from the inside of this collar that tab 142 extends to engage nose 140 of finger 138. An upper pad 190 of collar 186 bears on stop 146 in column 10 to limit vertical travel of the lever. A pad 192 on the lower side of collar 186 bears on stop 148 to limit travel in a downward direction of the lever. The lever extends as an arm laterally away from the column opposite the pivot to receive arm 20 and hand 21 likeness of the character.

FIG. 5 shows a reinforcing backing rib 194 which extends between platform wall 165 and vertical wall 160 to stabilize the platform. There are two of these ribs and they parallel each other. Wings 168 and 170 also extend between the horizontal platform wall and the vertical wall for this reinforcing function.

The pivot bracket mounts onto the column by a fastener 202 and a pair of hooks 204 and 206 which extend from wall 160. The hooks pass through registered slots in the column, shown at 208 and 210 in FIG. 2. The slots are comparatively long so as to permit vertical movement of the pivot bracket with respect to the column with the hooks in the slot. A cup 212 of the mounting base is long and comparatively narrow so that the vertical movement just mentioned can be accommodated by the cup. In mounting, wall 160 is contacted with lateral ribs 162 and 164 of the column and the hooks passed into slots 208 and 210. In this posture, cup 212 receives boss 156. The pivot bracket is then moved upwardly relative to the column so that the hooks engage reinforcing pads 214 on the inside of the column and the ovular slot of the cup bottoms on boss 156. The fastener is then driven home and the assembly is integrated.

A strap 220 passes a fastener which attaches the character to the column and from this attachment attaches the character to the base.

With particular reference to FIG. 2, base housing 12 is an enclosure walled on all sides for containing the telephone dialing equipment. A canted dialing deck 226 for a dialer or push buttons rises from a generally horizontal roof 228 of the base housing. A decorative piece 230 sets in a recess of the base housing roof.

The present invention has been described with reference to a certain preferred embodiment. The spirit and scope of the appended claims should not, however, necessarily be limited to the foregoing description.

What is claimed is:

1. A column construction for a telephone that is partially encased by a fanciful figure comprising:
    (a) a base housing adapted to receive a telephone network and having a hook switch;

(b) a column attached to the base housing and extending upwardly therefrom;

(c) a pivot bracket attached to the column by attachment means and extending laterally and away from one side of the column on the outside of the column;

(d) a lever pivotally secured to the pivot bracket at a location laterally away from the longitudinal centerline of the column, the lever extending laterally away from the column on the diametric opposite side from its pivotal mounting and having a section on the opposite side of the pivot which is adapted to attach an appendage of the figure, which appendage cradles and supports a telephone handset;

(e) an actuator engaged by the lever for movement in response to pivotal movement of the lever toward the base housing to a lower position when the handset is placed on the lever, the actuator being adapted to engage the switch of the telephone network housed in the base housing upon such pivotal movement of the lever;

(f) means biasing the actuator away from the base housing and into an upper position when the handset is off the lever; and (g) means to attach the figure to the column with the column covered by the figure;

whereby, the appendage moves through a small arc for its total movement during the pivoting of the lever.

2. The column construction claimed in claim 1 wherein means to attach the pivot bracket to the column comprise:

a pair of spaced-apart hook means;

a pair of slot means for receipt of the hook means and limited movement of the hook means in the slot means between an insert position where the hook means are inserted into the slot means normal to the direction of the slot means and a secure position where the hook means interfere with material bounding the slot means upon the presence of a force urging the hook means from the slot means normal to the direction of the slot means, the hook and slot means being of the pivot bracket and the column; and fastener means to fix the position of the pivot bracket with respect to the column when the hook means is in the secure position in the slot means.

3. The column construction claimed in claim 2 wherein the means to attach the pivot bracket to the column includes the column having a fastener boss and the pivot bracket having a cup, the cup having a longitudinal recess capable of receipt of the mounting boss and capable of allowing the mounting bracket relative movement with respect to the mounting boss, and the fastener means fixes the position of the pivot bracket with respect to the column by attachment between the two through the cup and mounting boss.

4. The column construction claimed in claim 1 wherein the lever has a collar accepting the top of the column, the pivot being on one diametric side of the collar and the section of the lever adapted to attach an appendage of the character extending from the opposite diametric side of the collar.

5. The column construction claimed in claim 4 wherein the actuator has a nose and the lever has a tab engaging the nose in sliding contact therewith so that pivotal movement of the lever about the pivot imparts essentially pure translation to the actuator, the tab extending inwardly from the collar on the side thereof opposite the pivot and on the same side thereof as the section of the lever adapted to attach an appendage.

6. An improved column and base housing construction for use in a telephone having a fanciful figure encasing a portion of the telephone comprising:

(a) a base housing adapted to house a telephone network of a personal telephone;

(b) a column mounted to the base housing and extending upwardly therefrom;

(c) a pivot bracket mounted to the column above and spaced from the base housing, the pivot bracket defining a pivot extending substantially to one side of the outside of the column;

(d) a lever pivotally mounted to the pivot bracket at the pivot for pivotal movement between an on-hook position towards the base housing and an off-hook position away from the base housing, the lever including a collar spaced laterally from the pivot and in receipt of the column and an arm extending from the collar on the side thereof diametrically opposite the pivot;

(e) means on the lever arm for accepting and cradling a telephone handset, the weight of the telephone handset on the acceptance and cradling means pivoting the lever to the on-hook position;

(f) an actuator in the column engaged by the lever for translation in response to pivotal movement of the lever between the on-hook position and the off-hook position, the actuator being adapted to switch a switch of the telephone network in the base housing;

(g) means biasing the actuator and lever away from the base housing to the off-hook position when the handset is off the lever arm; and (h) means to attach a fanciful figure to the column with the figure covering the column;

whereby, the acceptance and cradling means moves through a small arc for its total movement during the pivoting of the lever.

7. The column and base housing construction claimed in claim 6 including:

(a) a guide tube extending the length of the column and into the base housing;

(b) means between the guide tube and the top of the column for compressively engaging the column and tension loading the guide tube;

(c) means at the bottom of the guide tube for coupling the guide tube to the housing and tension loading the guide tube;

(d) means at the bottom of the column for coupling the column to the base housing with a compressive load between the two; and (e) the tension loading of the guide tube requiring both the tension applied by the column and the tension applied by the means coupling the guide tube to the housing, the compression loading of the column requiring both the compression applied by the guide tube and the compression applied by the means coupling the column to the base housing.

8. The column and base housing assembly claimed in claim 7 wherein the column comprises two shells joined together along a longitudinal parting plane.

9. The column and base housing claimed in claim 6 wherein:

(a) the pivot bracket includes:

(i) a first vertical wall lying against the column, and a second vertical wall spaced laterally away from the first vertical wall and the column;

(ii) a pair of vertical and spaced-apart wings joining the first and second vertical walls;

(iii) a pair of slots in the wings extending towards the axis of the column; and (b) the lever has:

(i) a web extending from the collar into a space between the pair of wings;

(ii) a pivot boss on the web and bearing on the second vertical wall; and (iii) a pivot pin in the boss and slots, the pivot pin providing the pivotal mounting of the lever.

10. The column and base housing assembly claimed in claim 9 including a pair of fingers extending on the outside of the wings from the web to retain the pivot pin from movement along its axis.

11. The column and base housing assembly claimed in claim 10 including:

a tab extending radially inward from an inside surface of the collar diametrically opposite the pivot pin;

the actuator having a nose with a radiused top in sliding bearing with the tab so that angular movement of the pivot is not imparted to the actuator;

means between the actuator and the column to restrain the actuator to essentially linear movement vertically along the axis of the column; and the pivot bracket has a laterally extending platform wall attached to the first and second vertical walls and the pair of wings with the vertical walls extending in opposite vertical directions from the platform wall.

12. The column and base housing claimed in claim 9 including means for mounting the pivot bracket to the column comprising:

hook means in a coupling position coupling the pivot bracket to the column and keeping the pivot bracket from moving laterally with respect to the column;

slot means in the column for receiving the hook means, the slot means having a length for movement of the hook means along the column, after insertion into the slot means, into the coupling position from an insertion position where the pivot bracket can move laterally; and fastener means to secure the pivot bracket to the column against movement vertically and laterally with respect thereto.

13. The column and base housing claimed in claim 12 wherein the column has a fastener boss and the pivot bracket has a cup, the cup having a longitudinal recess capable of receipt of the mounting boss and capable of allowing the mounting bracket relative movement with respect to the mounting boss to permit the movement of the hook means along the column from the insertion position to the coupling position, and the fastener means fixes the position of the pivot bracket with respect to the column by attachment between the two through the cup and mounting boss.

14. The column and base housing claimed in claim 13 including:

(a) a guide tube extending the length of the column and into the base housing;

(b) joint means between the guide tube and the top of the column for engaging the column with the guide tube;

(c) fastener means at the bottom of the guide tube for coupling the guide tube to the housing and tension loading the guide tube, the tension loading being reacted by the column at the joint means to establish thereby a compressive loading on the column; and (d) the fastener means also acting at the bottom of the column and coupling the column to the base housing with the compressive load between the two.

15. The column and base housing claimed in claim 14 wherein the column includes two shells joined together along a longitudinal parting plane, and including threaded fasteners holding the shells together proximate the joint means between the guide tube and the column.

* * * * *

UNITED STATES PATENT AND TRADEMARK OFFICE
CERTIFICATE OF CORRECTION

PATENT NO. : 4,087,650
DATED : May 2, 1978
INVENTOR(S) : Council A. Tucker

It is certified that error appears in the above-identified patent and that said Letters Patent are hereby corrected as shown below:

In the specification: Column 5, line 51, before "pivot" insert --a--. Column 5, line 67, "comparaively" should be --comparatively--. Column 5, line 68, "comparatively" should be --by--.

Signed and Sealed this

Seventh Day of November 1978

[SEAL]

Attest:

RUTH C. MASON
Attesting Officer

DONALD W. BANNER
Commissioner of Patents and Trademarks